US007969615B2

(12) United States Patent
Itagaki

(10) Patent No.: US 7,969,615 B2
(45) Date of Patent: Jun. 28, 2011

(54) IMAGE FORMING APPARATUS AND IMAGE PROCESSING APPARATUS

(75) Inventor: Tomohisa Itagaki, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 590 days.

(21) Appl. No.: 12/104,059

(22) Filed: Apr. 16, 2008

(65) Prior Publication Data

US 2008/0260397 A1 Oct. 23, 2008

(30) Foreign Application Priority Data

Apr. 19, 2007 (JP) ................................ 2007-111074

(51) Int. Cl.
*H04N 1/40* (2006.01)

(52) U.S. Cl. ....................................... 358/2.1; 358/3.28

(58) Field of Classification Search ................. 358/3.28, 358/1.9, 2.1, 3.06–3.14, 3.16–3.19, 3.21
See application file for complete search history.

(56) References Cited

U.S. PATENT DOCUMENTS

| | | | | |
|---|---|---|---|---|
| 5,864,406 | A | 1/1999 | Isaka et al. | 358/298 |
| 6,163,414 | A | 12/2000 | Kikuchi et al. | 359/776 |
| 6,256,110 | B1 | 4/2001 | Yoshitani | 358/1.9 |
| 7,058,215 | B2 | 6/2006 | Ikeda et al. | |
| 2005/0058476 | A1 | 3/2005 | Murakami | 399/366 |
| 2005/0219634 | A1 | 10/2005 | Murakami | 358/3.28 |
| 2008/0310873 | A1 | 12/2008 | Ono | |

FOREIGN PATENT DOCUMENTS

| | | |
|---|---|---|
| JP | 58-47708 | 10/1983 |
| JP | 5-167810 | 7/1993 |
| JP | 8-171252 | 7/1996 |
| JP | 11-4338 | 1/1999 |
| JP | 11-88653 | 3/1999 |
| JP | 11-191830 | 7/1999 |
| JP | 2001-197297 | 7/2001 |
| JP | 2001-353952 | 12/2001 |
| JP | 2003-80690 | 3/2003 |
| JP | 2005-91730 | 4/2005 |
| JP | 2005-94326 | 4/2005 |
| JP | 2005-94327 | 4/2005 |

*Primary Examiner* — Thomas D Lee
*Assistant Examiner* — Stephen M Brinich
(74) *Attorney, Agent, or Firm* — Fitzpatrick, Cella, Harper & Scinto

(57) ABSTRACT

An image forming apparatus forms an image for a latent image portion of which density is relatively higher with a dark color image forming portion, and forms an image for a background portion of which density is relatively decreased or of which image disappears, with a light color image forming portion, with respect to portions of forgery-preventing pattern image in which the density contrasts for the portions mutually differ after copying.

10 Claims, 14 Drawing Sheets

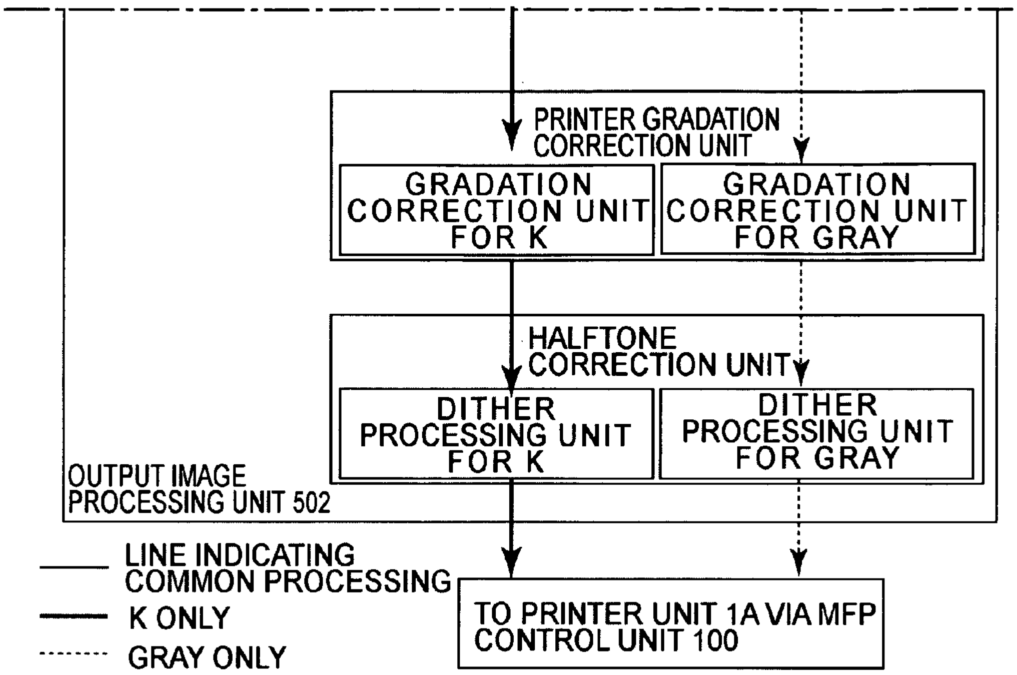
FIG.4B
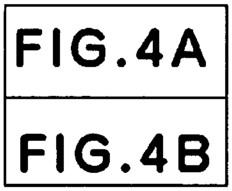

IMAGE FORMING APPARATUS AND IMAGE PROCESSING APPARATUS

FIELD OF THE INVENTION AND RELATED ART

The present invention relates to an image forming apparatus capable of combining a background of a document with a special pattern image such as a "forgery-preventing pattern/fine pattern" and a "camouflage pattern" and outputting a combined image in order to suppress forgery by copying of an important document or suppress information leakage, and an image processing apparatus used together with the image forming apparatus. More specifically, the present invention relates to an image forming apparatus including a plurality of functions such as a copy function and a print function of a copying machine or a printer for forming an electrostatic latent image on an image bearing member through electrophotography and then developing the electrostatic latent image by a developing device to obtain a toner image, and relates to an image processing apparatus used together with the image forming apparatus.

In recent years, an environment for performing communication via the Internet has been improved. Under the circumstances, opportunities for on-line shopping, purchasing various tickets, and so on using the WEB (World Wide Web), and printing tickets or payment slips, have increased. Many home printers have a function of embedding in a print product a two-dimensional symbol (for example, a quick response (QR) code) or a one-dimensional bar code including various information for certifying the authenticity of a document. Further, many home printers have a function of embedding a forgery-preventing pattern for preventing forgery. Under these circumstances, a higher-level of security has been required since an authentic and surely valuable ticket and the like can be easily prepared even at home.

At present, among forgery-preventing techniques, those for a "forgery-preventing pattern" are most popular. The forgery-preventing pattern produces an effect at the time of copying to achieve a forgery-preventing effect (see FIG. 14). The forgery-preventing pattern can be formed with a printer and also a copying machine having a print function.

More specifically, some receipts, bills, or certificates have thereon a special pattern of characters or images which appear (i.e., is visualized) so as to be easily recognized as a copied product. This special pattern is generally called a "forgery-preventing pattern". The forgery-preventing pattern has an effect of deterring copying of an (authentic) original document by being configured so that the original document is not easily duplicated by copying.

The forgery-preventing pattern includes an area in which dots remain after copying (hereinafter referred to as a "latent image portion") and an area in which dots disappear (hereinafter referred to as a "background portion"). That is, as illustrated in FIG. 15, the forgery-preventing pattern is macroscopically constituted by two areas having the same density. The latent image portion and the background portion are less recognizable because the density of the latent image portion and that of the background portion can be recognized as approximately the same when the forgery-preventing pattern is observed at a distance of about 30 cm (the distance is generally referred to as a "distance of distinct vision"). At a glance, it seems that a simple pattern exists or a light-colored portion exits. However, the latent image portion and the background portion microscopically have mutually different characteristics. When the forgery-preventing pattern is copied or printed, the density levels at the latent image portion and the background portion become mutually different, as illustrated by a hatched bar graph in FIG. 15.

For example, Japanese Patent Publication (JP-B) Sho 58-47708 discloses a method for forming a background portion in which dots disappear during copying with a high line number (per unit length), and a latent image portion with a low line number. This method utilizes a non-reproducibility in copying of relatively small dots formed with the high line number.

This phenomenon is attributable to factors such as a resolving power of a reader, an image processing method, a half-toning method, and a resolving power of a printer during copying. However, a tendency of the resolving power during copying is approximately the same level regardless of manufacturers and is such that copy reproducibility is decreased with an increasing line number. As described in JP-B sho 58-47708, the background portion needs to disappear but the latent image portion needs to remain during copying. Accordingly, a well-balanced line number and density range (dot %) have been conventionally selected to add the forgery-preventing pattern.

Further, as described in Japanese Laid-Open Patent Application (JP-A) 2005-94326, it is also possible to achieve the forgery-preventing pattern by changing a degree of dot concentration regardless of the line number. For example, a dot concentration-type dither matrix is used at a latent image portion and a dot dispersion-type dither matrix is used at a background portion. This method uses mutually different distances between isolated dots at the latent image portion and the background portion so that only the dots at the latent image portion can be reproduced during copying.

As described above, the "forgery-preventing pattern" achieves a forgery-preventing effect by utilizing a phenomenon such that a background portion disappears and a hidden image (latent image) appears in the case where the background portion is configured to exceed a limit of reproducible dots for a copying machine.

A general description of the forgery-preventing pattern is as described above.

Conventionally, manufacturers of a print paper printed a forgery-preventing pattern including a character or an image (latent image) such as "COPIED", "COPY", "confidential", "INVALID" or "VOID" on a dedicated paper in advance, and sold as a forgery-preventing paper. Then, public offices and companies purchased such a forgery-preventing paper and deterred or suppressed copying of an original print product by printing a document of which authenticity needs to be secured, on a forgery-preventing paper.

The above-described forgery-preventing paper was prepared by the manufacturers of the print paper. For this reason, there were disadvantages such as costs for use of the dedicated paper and for preparing more than a necessary number of print products.

Meanwhile, in recent years, a method for forming a forgery-preventing pattern image by software and outputting with a laser printer a document having the forgery-preventing pattern image on its background has been realized and has being attracting attention.

This on-demand method forgery-preventing pattern outputting method with the printer is capable of printing a document having a forgery-preventing pattern disposed on its background with plain paper. Accordingly, a necessary number of documents having the forgery-preventing pattern disposed on the background can be printed as needed. Thus, it is not necessary to previously store more than a necessary number of forgery-preventing papers, contrary to the case of the above-described conventional method. That is, with the on-demand method forgery-preventing pattern outputting method with the printer, the costs for the print papers can be significantly reduced compared with the case of the conventional forgery-preventing method of the document with the forgery-preventing paper.

As for the latent image, a serial number or an internet protocol (IP) address for identifying an output printer and a computer name or an IP address for identifying a computer which has issued a print command, for example, as well as a logo mark of a company and a character string such as "FORGERY-PREVENTING", can be used. Further, various information such as a user name or a login name for identifying a user who has issued a print instruction, a print job number for identifying by whom and when specific print processing was performed, a print date and time and a print location, and a file name of an electronic document can be selected as the latent image.

As described above, a high-level security which cannot be achieved with a conventional forgery-preventing paper which has been produced by offset printing can be achieved by the printer.

At this time when the environment in which tickets or payment slips can be prepared even at home and at a low cost is improved, interest in security is increased.

Incidentally, JP-A Hei 11-88653 describes a technique for embedding additional information in such a manner that a person cannot easily discriminate the embedded information, using a plurality of types of inks or toners having the same color and different densities. However, this technique differs from the above-described embedding technique of the "forgery-preventing pattern".

As described in JP-A Sho 58-47708 and JP-A 2005-94326, in the case of forming the forgery-preventing pattern image, minimum values for a distance between the centers of gravity between isolate dots are made different between the latent image portion and the background portion. In the case of the dot-concentration-type dither matrix, the distance between the centers of gravity between isolated dots is constant, and thus it is referred to as a "line number". However, the conventional method has the following problems.

That is, even when the macroscopic densities at the latent image portion and the background portion on an original document (forgery-preventing pattern output product) are adjusted to mutually match, the line number levels and the minimum distances between isolated dots are different between the latent image portion and the background portion. For this reason, there arises a problem that when the output product is watched more closely and carefully, the forgery-preventing pattern may become visualized.

In order to solve the problem, even when a difference between the minimum distances between isolated dots between the latent image portion and the background portion is decreased to suppress the visualization of the forgery-preventing pattern in the original document, a density contrast between the latent image portion and the background portion is decreased on a copied document (forgery-preventing pattern image-copied product). As a result, the forgery-preventing pattern is not clearly visualized at the latent image portion of the copied product in some cases.

SUMMARY OF THE INVENTION

A principal object of the present invention is to provide an image forming apparatus capable of forming a special image having a first image portion of which density is relatively high after copying and a second image portion of which density is relatively low or of which the image disappears after copying, with respect to portions providing a difference in density contrast after copying, and capable of increasing a difference in contrast between the first image portion and the second image portion on a copied document while suppressing visualization of the first image portion of an original document.

Another object of the present invention is to provide an image processing apparatus used in an image forming apparatus capable of forming a special image having a first image portion of which density is relatively high after copying and a second image portion of which density is relatively low or of which image disappears after copying, with respect to portions providing a difference in density contrast after copying, and including a dark color image forming station for forming an image with a recording material from at least one pair of recording materials having the same hue and different lightness and a light color image forming station for forming an image with a recording material from the above at least one pair of recording materials having the same hue, the toner used by the light color image forming station having a higher lightness than the recording material used by the dark color image forming station; the image processing apparatus being capable of increasing a difference in contrast between the first image portion and the second image portion on a copied document while suppressing visualization of the first image portion of an original document.

According to an aspect of the present invention, there is provided an image forming apparatus comprising:

a dark color image forming station for forming an image with a toner from at least one set of recording materials having the same hue and different lightness;

a light color image forming station for forming an image with a toner from the at least one set of recording materials having the same hue, the toner used by the light color image forming station having a higher lightness than the recording material used by the dark color image forming station; and a control portion for effecting control so that an image to be emphasized, including a first image portion and a second image portion, by partly disappearing or by relatively and partly decreasing in density is formable, wherein the first image portion has a relatively low line number of an image to be formed and is formable substantially only with the toner having the lower lightness, and the second image portion has a relatively high line number of an image to be formed and is formable substantially only with the toner having the higher lightness.

According to another aspect of the present invention, there is provided an image forming apparatus comprising:

a dark color image forming station for forming an image with a toner from at least one set of recording materials having the same hue and different lightness;

a light color image forming station for forming an image with such a toner of the at least one set of recording materials having the same hue than the recording material used by the dark color image forming station a higher lightness than the recording material used by the dark color image forming station; and a control portion for effecting control so that an image to be emphasized, including a first image portion and a second image portion, by partly disappearing or by relatively and partly decreasing in density is formable, wherein the first image portion is formed by a first dither and is formable substantially only with the toner having the lower lightness and wherein the second image portion is formed by a second dither having a minimum distance, between isolated dots of an image to be formed, smaller than that of the first dither and is formable substantially only with the toner having the higher lightness.

According to a further aspect of the present invention, there is provided an image processing apparatus for being used together with an image forming apparatus comprising a dark color image forming station for forming an image with a toner from recording materials having the same hue and different lightness, and a light color image forming station for forming an image with a toner from the recording materials having the same hue, the toner used by the light color image forming station having a higher lightness than the recording material used by the dark color image forming station; the image processing apparatus comprising:

an input portion for inputting thereinto an image data about a forgery-preventing pattern image to be emphasized, including a first image portion and a second image portion, by partly disappearing or by relatively and partly decreasing in density is formable; and a control portion for effecting control so that the first image portion which has a relatively low line number is formable substantially only with the toner having the lower lightness and that the second image portion which has a relatively high line number is formable substantially only with the toner having the higher lightness.

According to a still further aspect of the present invention, there is provided an image processing apparatus for being used together with an image forming apparatus comprising a dark color image forming station for forming an image with a toner from recording materials having the same hue and different lightness, and a light color image forming station for forming an image with a toner from the recording materials having the same hue, the toner used by the light color image forming station having a higher lightness than the recording material used by the dark color image forming station; the image processing apparatus comprising:

an input portion for inputting thereinto an image data about a forgery-preventing pattern image to be emphasized, including a first image portion and a second image portion, by partly disappearing or by relatively and partly decreasing in density is formable; and a control portion for effecting control so that the first image portion which is formed by a first dither is formable substantially only with the toner having the lower lightness and that the second image portion which is formed by a second dither with a minimum distance, between isolated dots of an image to be formed, smaller than that of the first dither is formable substantially only with the recording material having the higher lightness.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Hereinbelow, the image forming apparatus of the present invention will be described in detail with reference to the drawings.

Embodiment 1

[General Arrangement of Image Forming Apparatus]

Figure 1:
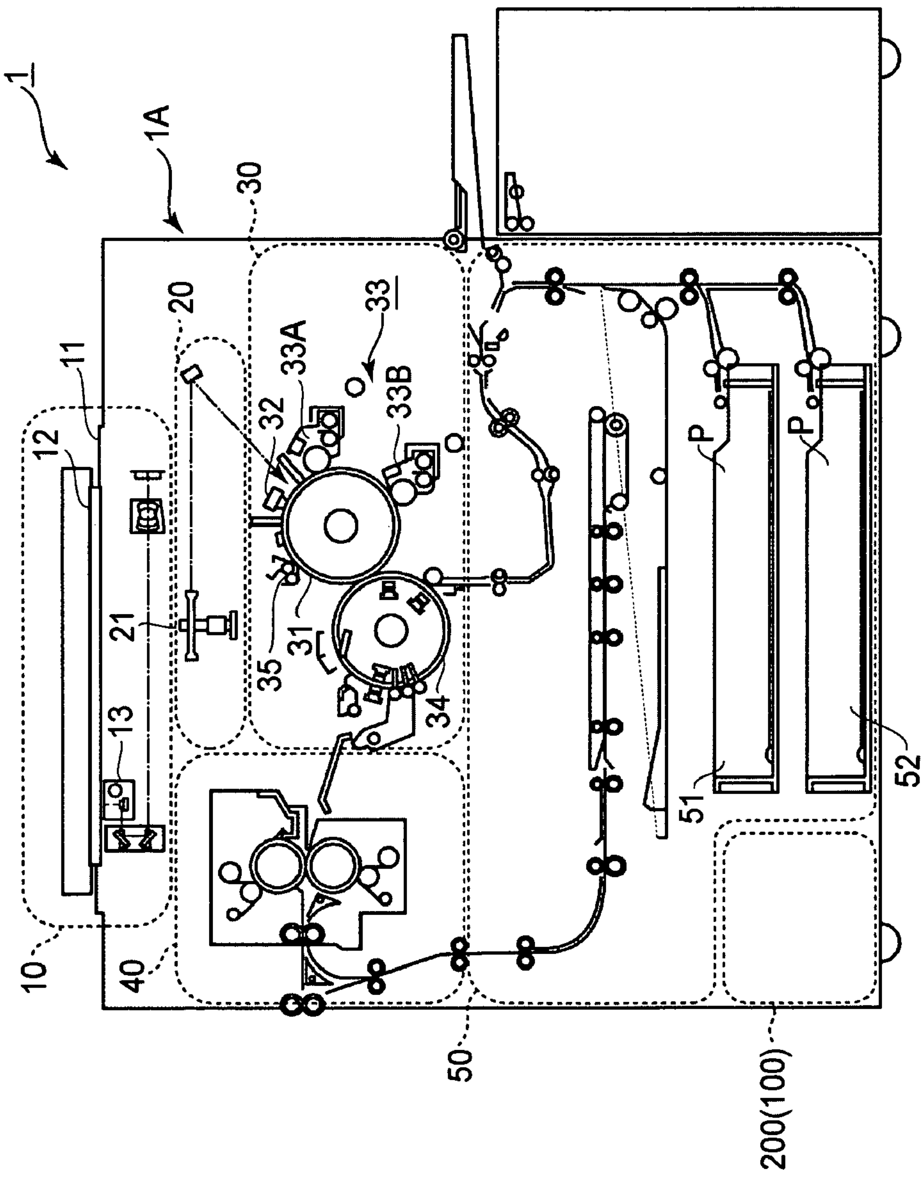
FIG. 1 is a schematic illustration of an embodiment of a multi-function peripheral (MFP) constituting an image forming apparatus according to the present invention.

FIG. 1 illustrates an embodiment of the image forming apparatus according to the present invention. In this embodiment, an image forming apparatus 1 is constituted by a two-color multi-function peripheral (MFP).

The MFP constituting an image forming apparatus 1 includes a scanner portion 10, a laser exposure portion 20, an image forming portion 30 provided with a photosensitive drum 31, a fixing portion 40, a paper feed/conveyance portion 50, and a printer portion (image forming station) 1A including a printer control portion 200 for controlling the scanner portion 10, the laser exposure portion 20, the image forming portion 30, the fixing portion 40, and the paper feed/conveyance portion 50.

The scanner portion 10 of the printer portion 1A irradiates an input image original 12 placed on an original supporting plate 11, with a light beam by an illumination device 13, to optically read the original image. After reading the original image, the scanner portion 10 converts the read image into an electrical signal to generate image data.

The laser exposure portion 20 causes a light beam modulated according to the image data, such as a laser beam, to enter a rotatable polygon mirror 21, which rotates at a constant angular speed. Then, the laser exposure portion 20 irradiates the photosensitive drum 31 as an image bearing member at the image forming portion 30 with the light beam as a reflection scanning light.

The image forming portion 30 forms an image through an electrophotographic process in this embodiment. Accordingly, the image forming portion 30 includes a drum-like electrophotographic photosensitive member, i.e., the photosensitive drum 31) as the image bearing member, as described above.

The photosensitive drum 31 is rotationally driven by a driving means (not shown) and is electrically charged uniformly by a charging device 32. The electrically charged photosensitive drum 31 is exposed to light by the laser exposure portion 20. Thus, an electrostatic latent image is formed on the photosensitive drum 31. The electrostatic latent image formed on the photosensitive drum 31 is then developed with a developer (toner) contained in a developing device 33 into a visible image (i.e., a toner image).

The developing device 33 includes developing units containing at least two colorants, namely, an achromatic light color toner or a light color toner whose lightness is higher of toners having different lightness levels in the same hue, and an achromatic dark color toner or a dark color toner whose lightness is lower of toners having different lightness levels in the same hue.

The toner having a high lightness (light color toner) refers to a toner having a maximum density of 0.8 or less. Here, the "maximum density" refers to an optical density of a solid image (an image which is yet to be subjected to halftoning processing such as screening) after fixing and when a toner amount (per unit area) on a transfer sheet (recording material) is 0.5 mg/cm$^2$.

In this embodiment, the density was measured according to Status A Visual Density. The measurement was performed with a 500 Series Spectrodensitometer (mfd. by X-Rite, Incorporated). The macroscopic density was measured at an aperture of 6 mmΦ for a light-receiving side and a light-emitting side. In this embodiment, an amount of pigment was adjusted so that the maximum density of the light color toner is 0.6.

The toner having a low lightness (dark color toner) refers to a toner having a maximum density of 1.2 or more. In this embodiment, an amount of pigment was adjusted so that the maximum density of the dark color toner is 1.5. A carbon black was used as the pigment in this embodiment. The pigment was adjusted so that a carbon black content in the light color toner is 40% of that in the dark color toner.

It is to be noted that the term "density" hereafter refers to a macroscopic density obtained by measurement using the above-described 500 Series Spectrodensitometer of X-Rite, Incorporated, under the measurement condition Status A Visual Density, unless otherwise noted herein.

In this embodiment, the developing device 33 includes a developing unit (developing station) 33A which constitutes a dark color image forming means and a developing unit (developing station) 33B which constitutes a light color image forming means. That is, the developing unit (developing station) 33A includes a black toner and the developing unit (developing station) 33B includes a gray toner. The developing device 33 can also include other developing units having colorants of a light color and a dark color in the same hue for other color toners such as a yellow toner, a cyan toner, and a magenta toner. Incidentally, in the case where the colorant is changed to a chromatic colorant, the measurement is required to be performed to employ a complementary color (red for cyan, green for magenta, and blue for yellow) with respect to a filter which is one of density measurement conditions. In this case, the same measurement conditions as in the case of black can be used.

As described above, according to this embodiment, the image forming apparatus 1 can include at least one pair of a dark color image forming means and a light color image forming means. The dark color image forming means forms an image using a developer of which lightness level is lower of at least one set of achromatic developers or at least one set of developers having different lightness levels in the same hue. The light color image forming means forms an image using a developer of which lightness level is higher of at least one set of achromatic developers or at least one set of developers having different lightness levels in the same hue.

In this embodiment, the toner image formed on the photosensitive drum 31 is then transferred onto a transfer material sheet P as a recording material carried by a transfer drum 34 as a transfer material carrying member. Minute toner remaining on the photosensitive drum 31 without being transferred is collected by a cleaning device 35.

During the transfer of the toner image from the photosensitive drum 31 onto the transfer material sheet P, the transfer material sheet P winds around the transfer drum 34 at a predetermined position. Then, the transfer drum 34 rotates two times. During this operation of the transfer drum 34, the developing unit 33A which includes the black toner, and the developing unit 33B which includes the gray toner, takes turns to repeatedly and serially perform the above-described electrophotographic process, and form a toner image of two colors on the transfer material sheet P. The transfer material sheet P having the toner image of two colors after the two rotations of the transfer drum 34, is then separated and conveyed from the transfer drum 34 to the fixing portion 40.

The fixing portion 40 is constituted by a combination of rollers and belts. The fixing portion 40 further includes a heat source such as a halogen heater. The fixing portion 40 applies heat and pressure to the transfer material sheet P having the toner image transferred by the image forming portion 30, to melt and fix the toner on the transfer material sheet P.

The paper feed/conveyance portion 50 includes one or more sheet storages 51 and 52 such as a sheet cassette or a paper deck. The paper feed/conveyance portion 50 separates one sheet P from a plurality of sheets P which are stored in the sheet storages 51 and 52, according to an instruction from the printer control portion 200, and conveys the separated sheet P to the image forming portion 30 and the fixing portion 40.

The sheet P is wound around the transfer drum 34 of the image forming portion 30. After the transfer drum 34 rotates two times in this state, the sheet P is conveyed to the fixing portion 40 as described above. During the two rotations of the transfer drum 34, the toner images of gray and black are transferred onto the sheet P. In the case of forming an image on both sides of the sheet P, the printer control portion 200 performs control so that the sheet P having passed through the fixing portion 40 is guided again into a conveyance path leading to the image forming portion 30.

The printer control portion 200 communicates with an MFP control portion 100 which controls the entire MFP. The printer control portion 200 performs control according to an instruction from the MFP control portion 100. Further, the printer control portion 200 manages conditions of the respective portions (the scanner portion 10, the laser exposure portion 20, the image forming portion 30, the fixing portion 40, and the paper feed/conveyance portion 50) and provides instructions so that the entire portions smoothly and harmoniously operate.

[MFP System Constitution]

Figure 2:
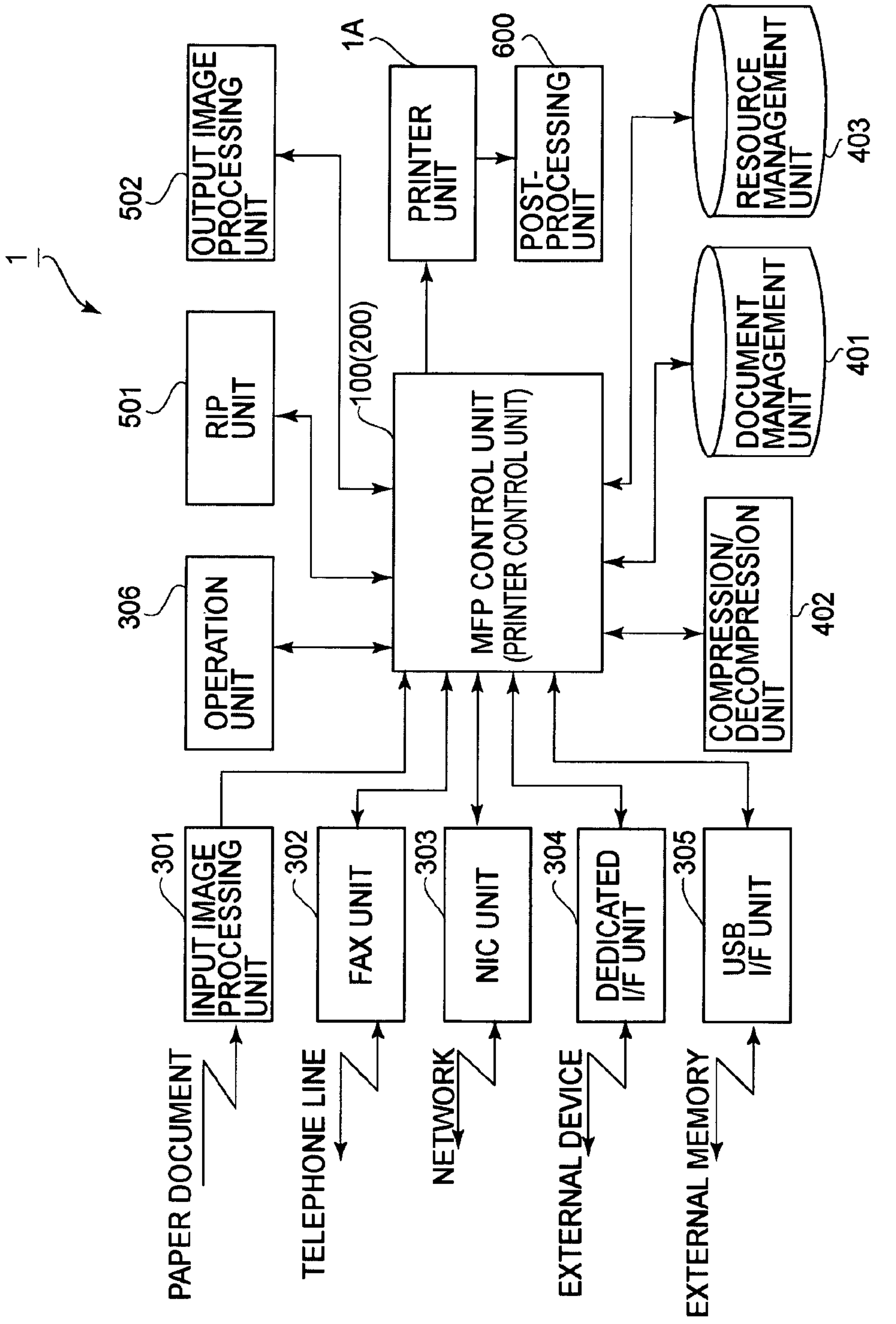
FIG. 2 is a block diagram illustrating details of an image processing portion of the MFP.

FIG. 2 illustrates an MFP system constitution which constitutes the image forming apparatus 1 in this embodiment.

In this embodiment, as illustrated in FIG. 2, the image forming apparatus 1 includes the image forming station 1A having a plurality of functions. That is, the MFP system constituting the image forming apparatus 1 includes a storing member such as a hard disk or the like which can store data for a plurality of jobs.

Further, the MFP system has a copy function for printing job data which has been output from the scanner portion 10, with a printer portion (i.e., image forming portion) 1A via the storing member. In addition, the MFP system has a print function for printing job data which has been output from an external apparatus such as a computer, with the printer portion 1A via the storing member.

The image forming apparatus 1 includes an input image processing portion 301 configured to read an image of a document such as a paper original and image-process the read image data, and a FAX portion 302 such as a facsimile apparatus configured to send and receive an image through a telephone line. Further, the image forming apparatus 1 includes a network interface card (NIC) portion 303 configured to send and receive image data and apparatus information via a network. Further, the image forming apparatus 1 includes a dedicated interface (I/F) portion 304 or a universal serial bus (USB) I/F portion 305 for sending and receiving image data and information between the image forming apparatus 1 and an external apparatus. The USB I/F portion 305 sends and receives image data and information between the image forming apparatus 1 and a USB device such as a USB memory (one of removable media).

The MFP control portion 100 has a function of performing traffic control such that image data is temporarily stored or a data path is determined, depending on the purpose of use of the MFP.

A document management portion 401 includes a storing member such as a hard disk capable of storing a plurality of image data. The printer control portion 200 (a central processing portion (CPU) of the MFP control portion 100) of the image forming apparatus 1, for example, performs control for storing a plurality of image data on the hard disk. For example, the hard disk can store image data from the input image processing portion 301, image data of a facsimile job inputted via the FAX portion 302, and image data from an external apparatus such as a computer inputted via the NIC portion 303. Further, the hard disk can store various image data input via the dedicated I/F portion 304 or the USB I/F portion 305.

The MFP control portion 100 performs control to appropriately read the image data from the hard disk, transfer the image data to an output portion such as the printer portion 1A, and allow the printer portion 1A to perform output processing such as print processing. Further, the MFP control portion 100 performs control to transfer the image data read from the hard disk to an external apparatus such as a computer or another image forming apparatus, according to an instruction provided by an operator via an operating portion 306.

In storing image data in the document management portion 401, the MFP control portion 100, as necessary, performs compression and decompression via a compression/decompression portion 402. The compression/decompression portion 402 compresses image data and in loading the compressed image data stored in the document management portion 401, decompresses the compressed image data into original image data. Further, it is generally known that compressed data such as Joint Photographic Experts Group (JPEG) data, Joint Bi-level Image Experts Group (JBIG) data, or ZIP data in transmitting data via a network is used. After the compressed data is inputted into the MFP, the compression/decompression portion 402 decompresses the input compressed data.

A resource management portion 403 stores various common parameter tables storing font data and gamma tables. The MFP control portion 100 can refer to the tables as necessary, store a new parameter table, or modify or update the parameter table stored in the resource management portion 403.

When page description language (PDL) data is inputted into the MFP, the MFP control portion 100 performs raster image processor (RIP) processing on the inputted PDL data at an RIP portion 501. Further, the MFP control portion 100, as necessary, performs image processing for printing on an image to be printed at an output image processing portion 502. Further, intermediate data or print-ready data (bitmap data for printing or data obtained by compressing the bitmap data) of image data which is generated during the processing by the RIP portion 501 or the output image processing portion 502, can be stored in the document management portion 401 again, as necessary.

Then, the thus processed image data is sent to the printer portion 1A. After the image data is printed and outputted by the printer portion 1A, the sheet P having the image data is then conveyed to a post-processing portion 600, where sorting and finishing on the sheets P are performed.

(1) Output Processing of Copy Original (Copied Product of Forgery-Preventing Pattern Image)

Figure 3:
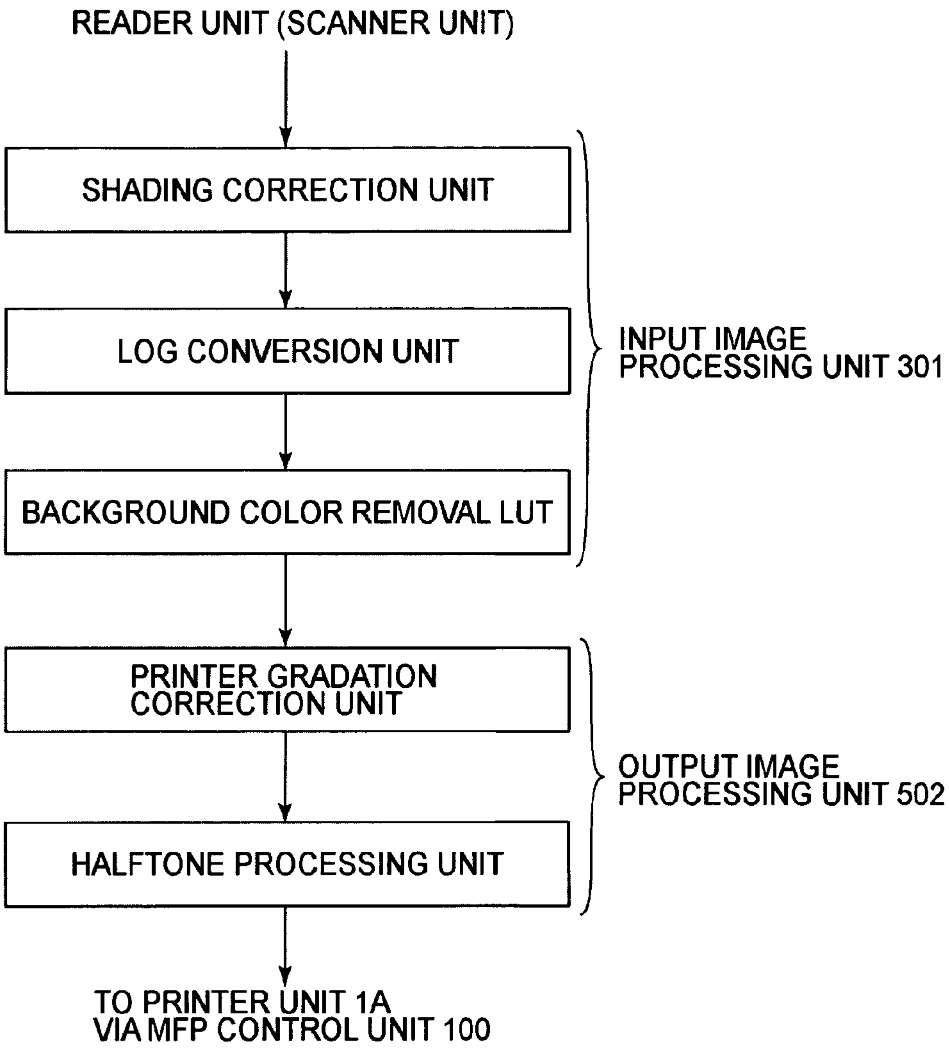
FIG. 3 is a flow chart illustrating copy image processing.

FIG. 3 is a flow chart for illustrating a general processing during copying/outputting in this embodiment. Image data inputted from a reader is sent to a separation output portion of the output image processing portion 502 via a shading correction portion for correcting in-plane non-uniformity of the scanner, a LOG conversion portion for converting a luminance signal from the reader into a density signal, and a background color removal LUT for preventing fog occurring in copying an original.

Figure 7:
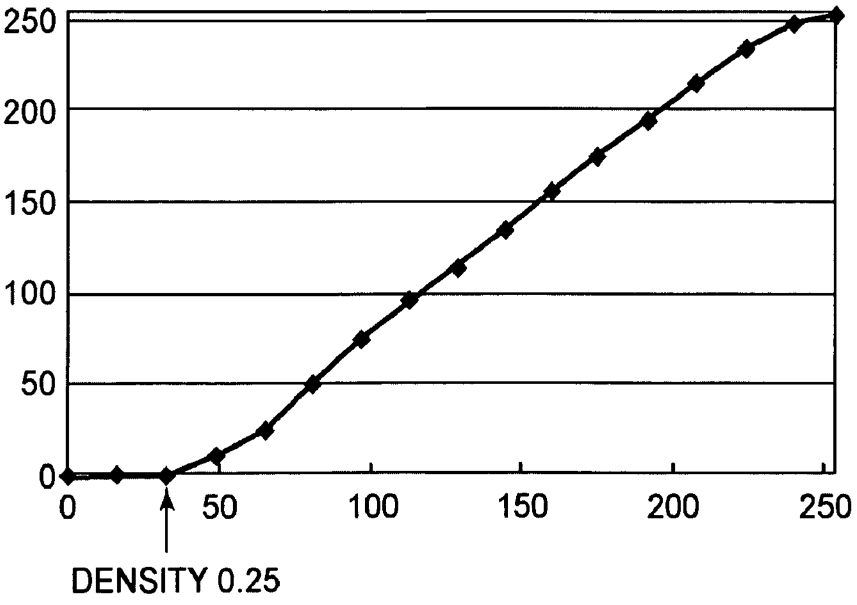
FIG. 7 illustrates a background color removal look-up table (LUT).

The background color removal LUT converts an input signal in a low density area into density level "0" as shown in FIG. 7, thus performing input/output conversion so as not to detect a density signal for the background portion. The image data is subjected to dither processing based on the background color removal LUT (FIG. 7) or by a halftoning portion to disappear or be reproduced in dots having a diameter smaller than the original. The background color removal LUT is one of the functions in a normal mode of the copying machine.

When the original is intended to be faithfully reproduced, the color of paper of the original itself affects the image quality. More specifically, creases, curling, and folds on the original are also colored, thus lowering the image quality of the copied product. Further to say, toner is used also in unnecessary portions, thus being disadvantageous in terms of running costs.

The background color removal function is included in the input image processing portion 301 and can be realized by employing such a one-dimensional input/output table called an LUT that a highlight portion is caused to less occur as shown in FIG. 7.

In FIG. 7, an abscissa represents an input signal value taken as 0 for a density of 0.04 of the original and taken as 255 for a density of 1.6 of the original. An ordinate represents an output signal value after signal conversion and is taken as 255 for a maximum density of 1.5 of the printer. The graph of FIG. 7 is characterized in that the output signal value stays at 0 in the highlight portion. The density level at the time of reading the original is set to be higher than the maximum printer density. The original is not limited to a product outputted from the printer but may also be a print product or a photograph. Thus, the reading area is larger than that for the printer.

The background color removal LUT function is performed after the luminance signal read by the reader is LOG-converted into density information. The processing up to the background color removal LUT function is performed by the input image processing portion 301.

In this embodiment, a reader input signal having a signal value of 32 or less is converted into the density of 0. A reader input signal having a signal value more than 32 is output-converted to obtain a linear tone gradation. In this embodiment, an image of a reader input signal having a value of 32 or less is not visualized. However, the reference is not limited to that value but may also be appropriately set.

In the case of forming an image with both the gray toner and the black toner, the input image data is sent to the separation output portion, and then the separation output portion sends the received image data to a combining portion for black (K) and a combining portion for gray. In the case where the forgery-preventing pattern is not formed, no forgery-preventing pattern is combined with the image data at the combining portion for K and the combining portion for gray. The image data which has been combined with no forgery-preventing pattern is sent to a printer tone gradation correction portion and then to a halftone processing portion.

The printer gradation correction portion performs tone gradation correction processing for correcting a tone gradation depending on a change with time and a change with temperature and humidity. The halftone processing portion performs halftoning (dithering), which is called pseudo-halftoning processing.

Figure 4A:
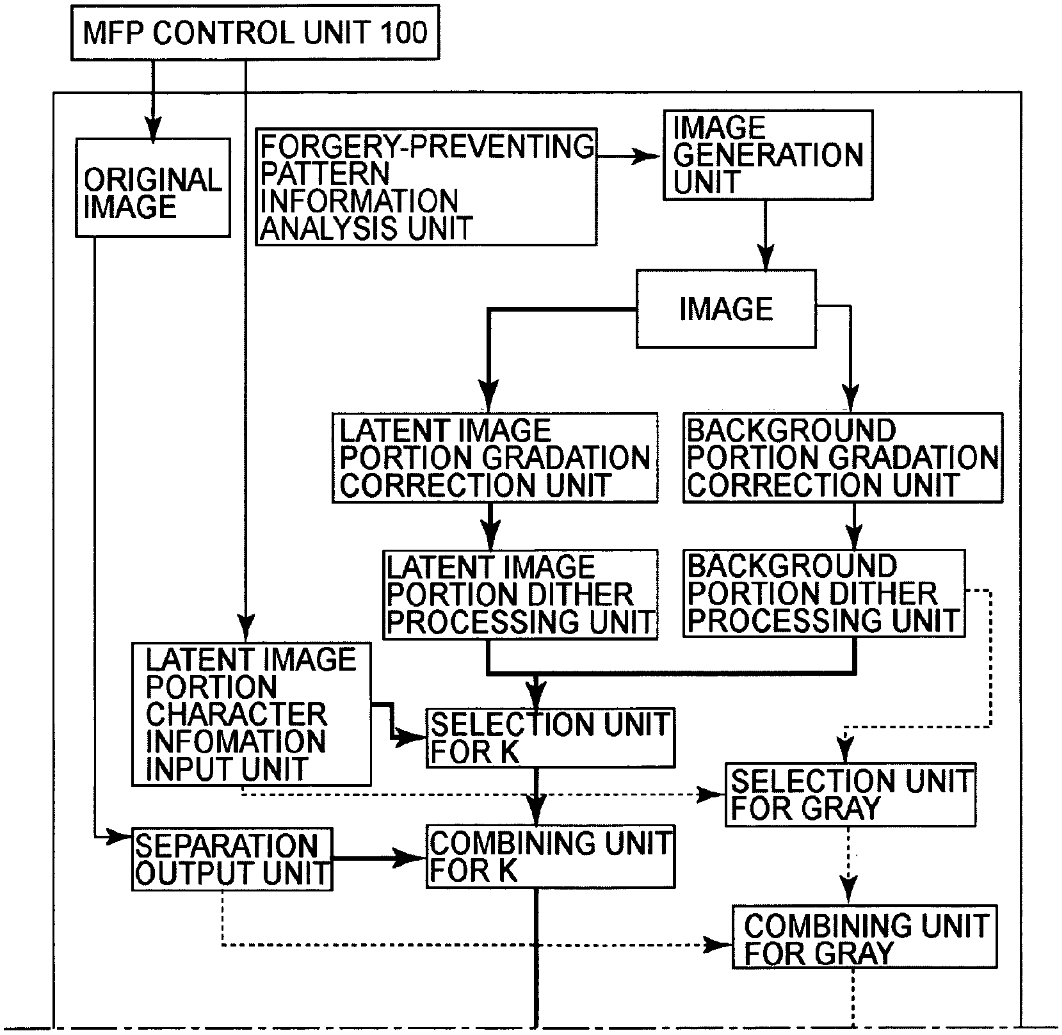
FIG. 4 (4A and 4B) is a block diagram illustrating details of an output image processing portion.

In the cases of a copied image and print for which no instruction for forming forgery-preventing pattern has been instructed, the image data is subjected to processing indicated by a common processing line in FIG. 4, starting from the processing for an "original image" (FIG. 4). In other words, processing for the forgery-preventing pattern in FIG. 4 (including processing in the combining portions) is not performed.

(2) Output of Original (Forgery-Preventing Pattern)

Processing for outputting a forgery-preventing pattern image by the image forming apparatus in this embodiment will be described. In this embodiment, as described later, the image forming apparatus of this embodiment includes a simple forgery-preventing pattern mode (first mode) for forming a forgery-preventing pattern image with only the black toner, and a high-quality forgery-preventing pattern mode (second mode) for forming a forgery-preventing pattern image with both of the black toner (toner having a low lightness) and a gray toner (toner having a high lightness) (see Table 1).

Forgery-preventing pattern processing performed by the output image processing portion 502 will be described in detail with reference to a block diagram illustrating the forgery-preventing pattern image processing in FIG. 4. Incidentally, the output image processing portion 502 also functions as an image processing apparatus for generating an image signal for forming the forgery-preventing pattern image.

The output image processing portion 502 includes a forgery-preventing pattern information analysis portion for analyzing a forgery-preventing pattern generation condition instructed by a printer driver and includes an image generation portion for generating an original image by taking an image size or the like into consideration. The image generation portion includes a latent image portion tone gradation correction portion and a background portion tone gradation correction portion, which are configured to correct the tone gradation at the latent image portion and the background portion, respectively, so that a generated image can be outputted at a desired density level.

After an image is generated by the image generation portion, the output image processing portion 502 executes the tone gradation correction for the latent image portion and the background portion. At this stage of the processing, when the density varies depending on a change in a printer engine environment or on an endurance degradation of the printer engine, a table is updated according to engine characteristics.

In the calibration method described in JP-A 2005-91730, an LUT for the tone gradation correction portion is updated. In this embodiment, since a gray toner is used for the background portion, it is necessary to use an LUT for gray toner. An LUT is provided for each toner color. During the processing, the output image processing portion 502 read from the LUT from an HDD or a memory (not shown) to perform the tone gradation correction.

Then, the output image processing portion 502 performs dithering (dither processing) at the background portion and the latent image portion with a dithering portion provided for each portion. This stage of the processing differs between the simple forgery-preventing pattern and the high-quality forgery-preventing pattern. The output image processing portion 502 reads a dither matrix suitable for a condition determined according to the type of forgery-preventing pattern. The output image processing portion 502 performs dithering by using a dithering method with a dither matrix (see JP-A 05-167810).

The dither matrix is a binary matrix. An image signal is a multi-valued signal at the time of its input of which density information ranges from 0 to 255. After the dithering is performed, the density information is either 0 or 255. In changing the line number for the background portion or the latent image portion, it is necessary to change the values at the dithering portion.

In the case where the high-quality forgery-preventing pattern is selected, the output image processing portion 502 performs the dithering for gray at the background portion. A subsequent flow of the processing differs according to the color of the toner.

In the case of the simple forgery-preventing pattern, the processing goes to processing performed by a selection portion for black (K), since only the black toner is used. In the case of the high-quality forgery-preventing pattern, the processing goes to the processing performed by the selection portion for K and a selection portion for gray, since both the black toner and the gray toner are used.

A character information input portion for the latent image portion inputs information about a character to be embedded in the latent image portion, which has been instructed by the printer driver, and sends the information to the selection portion for K and the selection portion for gray.

In the case of forming the high-quality forgery-preventing pattern, the output image processing portion 502 instructs the selection portion for K to form a latent image at the latent image portion, also instructs the selection portion for gray to form a background image at the background portion, and allows the respective selection portions to perform the instructed processing. In principle, the latent image portion and the background portion are mutually exclusive. Accordingly, the background portion is not formed at a portion where a latent image has been formed.

In the case of the simple forgery-preventing pattern, the output image processing portion 502 sends information only to the selection portion for K and instructs the selection portion for K to form an image at both the latent image portion and the background portion with the black toner, so that the selection portion for K performs the instructed processing.

Further, the output image processing portion 502 includes a character information input portion for the latent image portion for inputting information about a character to be formed at the latent image portion, the selection portions (the selection portion for K and the selection portion for gray) each for selecting a color of the image to be formed based on the input character information, and combining portions (a combining portion for K and a combining portion for gray)

each for combining the forgery-preventing pattern with an ordinary image. An image signal for the ordinary image is sent to the separation output portion, at which the image is separated and outputted as necessary.

The separation output portion analyses the input image and separately performs an output for gray and black when the input image has data for two colors (multi channel setting). Then, the output image processing portion 502 sends the separation-output data to each of the combining portions, at which the ordinary image is superimposed on the forgery-preventing pattern. The ordinary image and the forgery-preventing pattern are combined with each other so that the forgery-preventing pattern is not formed at a portion at which the ordinary image is formed (with respect to both the background portion and the latent image portion) but is formed at the portion at which there is no image.

The combined image for each color toner is then subjected to tone gradation correction at the respective printer tone gradation correction portions. This processing is performed for outputting the ordinary image at a desired density level, and does not affect the portion at which the forgery-preventing pattern (which has been already binarized) has been formed (the signal is not changed at this portion).

Similarly, the forgery-preventing pattern has been binarized at the respective halftoning correction portions does not affect the forgery-preventing pattern portion but only affects ordinary image portions. Incidentally, a line number in the dithering for K is 141 lines per inch (lpi), and a line number in the dithering for gray is 166 lpi, for the ordinary image. However, in this embodiment, the line number is not limited to these values but may also be appropriately set. The line number of the ordinary image may be the same as or different from that of the forgery-preventing pattern image.

After being subjected to the dithering, the image signal for the forgery-preventing pattern image is sent to the printer portion 1A via the MFP control portion 100.

[Colorant for Forgery-Preventing Pattern]

Hereinbelow, the feature of the present invention will be described.

The image forming apparatus according to the present invention is capable of forming a latent portion image, constituting the forgery-preventing pattern image, which will be relatively increased in density when copied. The latent portion image is formable with such a developer (dark color toner) of achromatic developers or developers having the same hue and different lightness as has a lower lightness. Further, the image forming apparatus according to the present invention is capable of forming a background portion image, constituting the forgery-preventing pattern image, which will be relatively decreased in density when copied. The background portion image is formable with such a developer (light color toner) of achromatic developers or developers having the same hue and different lightness as has a high lightness.

That is, in the image forming apparatus of this embodiment, the MFP control portion 100 as a control means is capable of effecting control so that the latent image portion image is formed with the dark color toner and the background portion image is formed with the light color toner.

In the image forming apparatus of this embodiment, the light color toner is a gray toner having a maximum density of 0.6 and the dark color toner is a black toner having a maximum density of 1.5. By employing this constitution, it is possible to form a high-quality forgery-preventing pattern image.

Here, the "high-quality forgery-preventing pattern image" refers to a forgery-preventing pattern image of which densities at the latent image portion and the background portion are substantially the same on an original (a forgery-preventing pattern print) and of which a difference in line number (a minimum distance value of distances between the centers of gravity between adjacent isolate dots) between the latent image portion and the background portion is small, and has a high contrast between the density at the latent image portion and that at a background portion in a copied product (as a result of copying the forgery-preventing pattern image).

As the difference in the line number between the latent image portion and the background portion of the original is smaller, image characteristics at the latent image portion and the background portion are closer to each other. Accordingly, it is possible to suppress visualization only at the latent image portion in the original, and thus it is possible to obtain a high-quality forgery-preventing pattern image.

[Principle of Forgery-Preventing Image Formation]

A constitution for forming the forgery-preventing pattern image in of the image forming apparatus of this embodiment and a principle of forgery-preventing pattern image formation will be described below.

As is described above with respect to the conventional method, a copying machine cannot appropriately reproduce a pattern having high line number. This phenomenon occurs due to various factors such as a reader resolving power (MTF), an image processing method (background color removal function), halftoning, and a resolution of the image forming apparatus. In this embodiment, a characteristic of forgery-preventing pattern is obtained by utilizing the reader MTF and the background color removal function.

Figure 6:
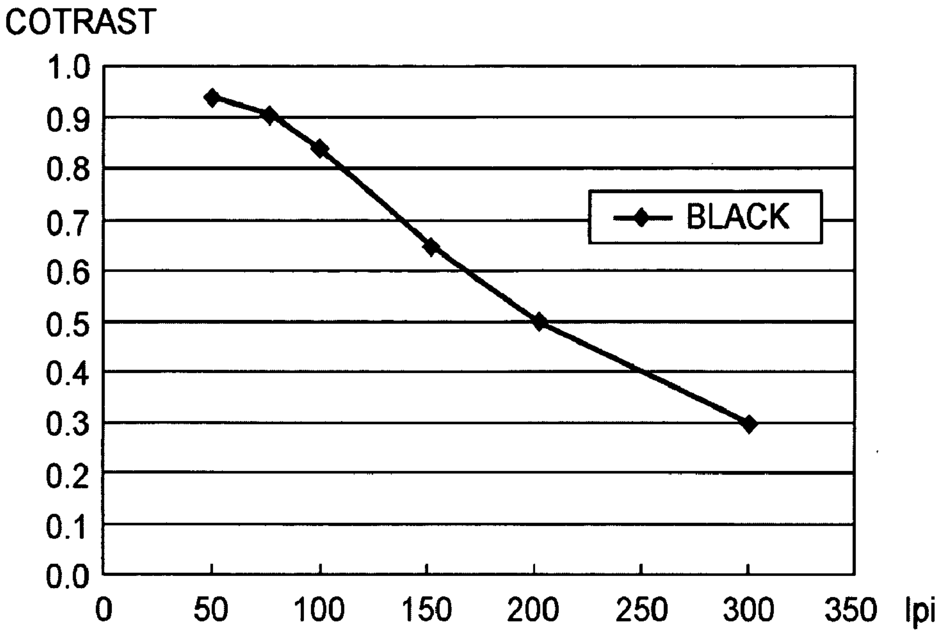
FIG. 6 is a graph for illustrating a reader modulation transfer function (MTF) for a black toner.

The MTF characteristics (resolving power characteristics) of the reader used in this embodiment is shown in FIG. 6.

In FIG. 6, the line number is taken on an abscissa. On an ordinate, a line number-dependent characteristic of a contrast between a maximum luminance (paper) and a minimum luminance (maximum density portion) is represented when the contrast between the maximum luminance (paper) and the minimum luminance (maximum density portion) is taken as 1.0. In this embodiment, the line number-dependent characteristic of the contrast between the maximum luminance level (paper) and the minimum luminance level (maximum density portion) as shown in FIG. 6 is referred to as an "MTF characteristic (resolving power characteristic)".

When the reader MTF is lowered, isolated dots blur at the time of reading an image (that is, the image is read as an image having a low density). In the case of forming the forgery-preventing pattern image on the original at the same density, by utilizing this characteristic, it is possible to cause an image to disappear only at the background portion during copying when image formation is performed so that an image portion at the background portion is formed in a high line number area in which isolated dots are liable to blur and that an image portion at the latent image portion is formed in a low line number area in which isolated dots are less liable to blur.

With respect to the reader MTF characteristic, characteristics of a glass material of a lens (a degree of polishing and material characteristics) or a flatness level of a mirror affects a curvature of field, a chromatic aberration, an increase in diffused light amount, a permeability of light beam, and the like, thus finally determine a resolving power. A method of changing the reader MTF is described in JP-A Hei 11-191830, thus being omitted from description.

[Scanner Portion]

Figure 9:
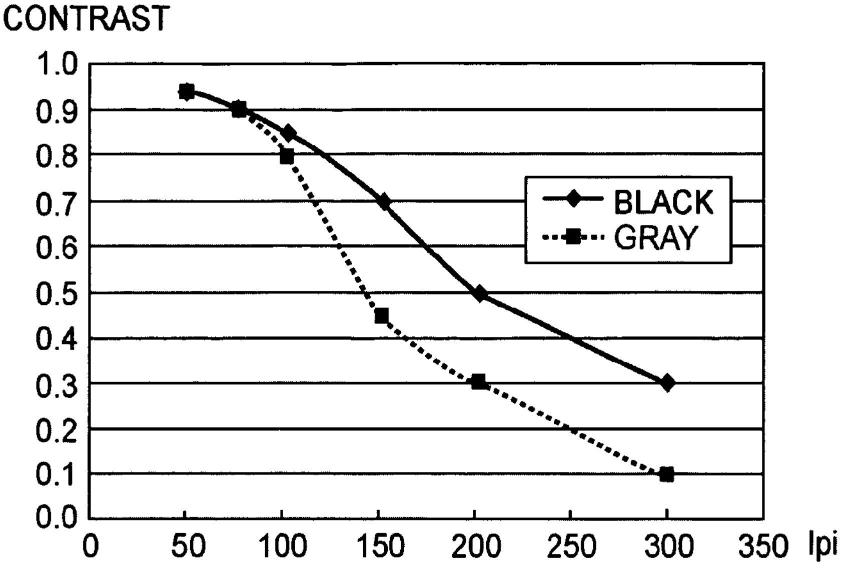
FIG. 9 is a graph for illustrating the reader MTF for a black toner and a gray toner.

The scanner portion (reader portion) 10 in this embodiment will be described. Reader MTF characteristics (resolving power characteristics) for a gray toner and a black toner in this embodiment are shown in FIG. 9.

The scanner portion 10 is a reader having line number of 300 lpi, a contrast for the black toner of 0.3, and a contrast for the gray toner of 0.1. The reader resolving power may preferably be 0.5 or less at the line number of 300 lpi. When the reader resolving power exceeds 0.5, dots at the background portion which are intended to be removed are to be reproduced without blurring.

Figure 10:
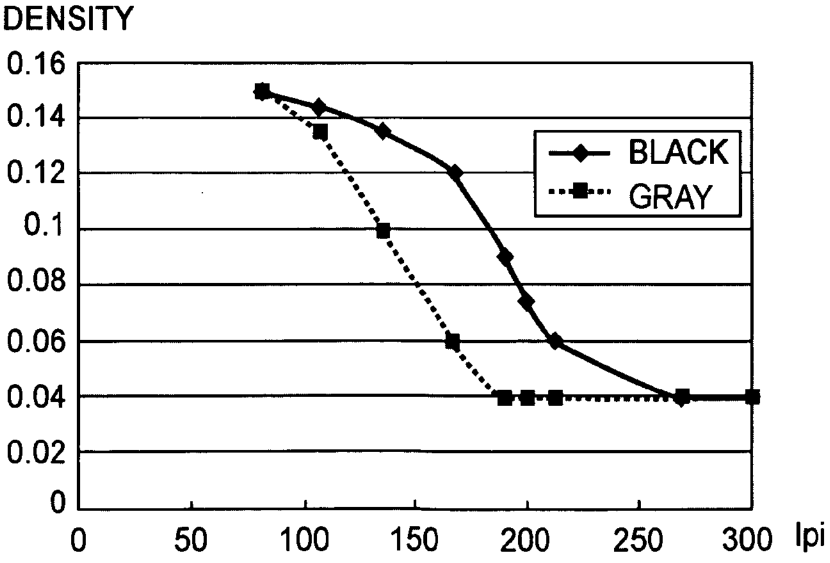
FIG. 10 is a graph showing a relationship between a line number (per unit length) and a copy density.

FIG. 10 is a graph showing an image density of a copied product produced by copying an original of which image has been formed by changing the line number using a black toner and a gray toner so that the density can be set at 0.15. In FIG. 10, an abscissa represents a line number and an ordinate represents a density. In the case of the black toner, the experiment showed sufficient copy reproducibility up to the line number of 166 lpi. In the area in which the line number is higher than 200 lpi, the image is light. At the line number level of 268 lpi, the image is not reproduced at all. The paper density is 0.04.

The resolution of the reader in this embodiment is 600 dpi. It is desirable that the reader resolving power is 300 dpi or more. This is because there is a possibility that, when the reader resolving power is less than 300 dpi, dots having a large diameter and a low line number at the latent image portion are digitally blurred to lower the density.

The resolution is a numerical value representing how small an area can be to transmit image information as a signal. The resolving power is a numerical value representing an actual reading ability. For example, when a reader (resolution: 600 dpi) is caused to read a high-definition chart, the reader, in many cases, may show a contrast ratio of about 0.3 to 0.5 in a pattern having a line number of 300 lpi.

The contrast ratio refers to a ratio of a contrast in a specific line when a difference in read value between a white patch and a black patch which have an approximately 2 cm square shape is taken as 1 (i.e., a ratio of a contrast of a 300 lpi chart to a contrast between the white patch and the black patch which have the approximately 2 cm square shape). As the contrast ratio is lower, the degree of blur is higher. The 300 lpi corresponds to a 600 dpi pattern having one pixel space per one pixel line. When the contrast is 0.3, the above pattern cannot be reproduced during binarization by dithering.

The high-definition chart can be prepared by direct digital color proofing (DDCP) processing ("Digital Konsensus Pro", mfd. by Konica Minolta Graphic Imaging, Inc.) for forming a 600 dpi pattern having one pixel space per one pixel line with only black and white portions. Further, the high-definition chart can also be prepared by a film setter ("GENASETT" or the like, mfd. by DAINIPPON SCREEN MFG. CO., LTD.).

[Forgery-Preventing Pattern Parameter]

The image processing portion in this embodiment performs image processing under output conditions described in Table 1 below. That is, the line number at the background portion is 190 lpi and the line number at the latent image portion is 166 lpi. The density is set at 0.15. Forgery-preventing pattern image forming modes include a high-quality forgery-preventing pattern image forming mode (HQ-FPP mode) and a simple forgery-preventing pattern image forming mode (S-FPP mode), which are selectable by an operator as desired.

TABLE 1

| | HQ-FPP mode | | S-FPP mode | |
|---|---|---|---|---|
| FPP*1 area | BP*2 | LIP*3 | BP | LIP |
| Colorant | gray | black | black | black |
| Macro density | D = 0.15 | D = 0.15 | D = 0.15 | D = 0.15 |
| Line number | 190 lpi | 166 lpi | 268 lpi | 166 lpi |

*1FPP means a forgery-preventing pattern.
*2BP means a background portion.
*3LIP means a latent image portion.

Figure 11:
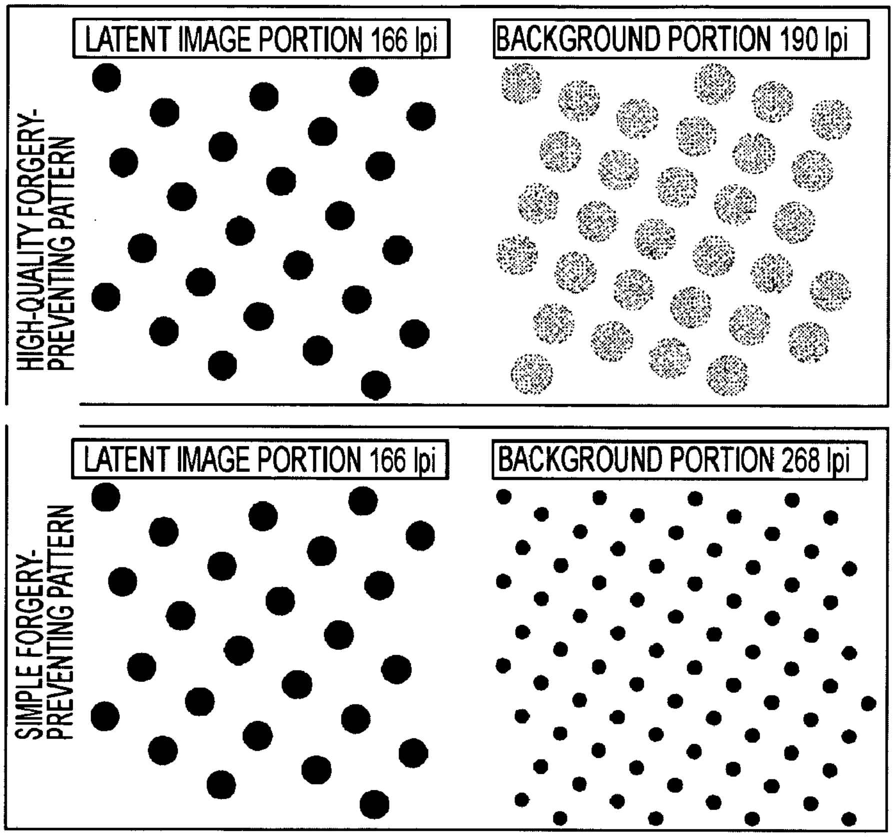
FIG. 11 illustrates dot arrangements at a latent image portion and a background portion.

FIG. 11 is a schematic view showing dot arrangements in the case of forming forgery preventing pattern images in the high-quality forgery-preventing pattern image forming mode and the simple forgery-preventing pattern image forming mode under the output conditions in Table 1. In FIG. 11, each black dot is an isolated dot.

Figure 8:
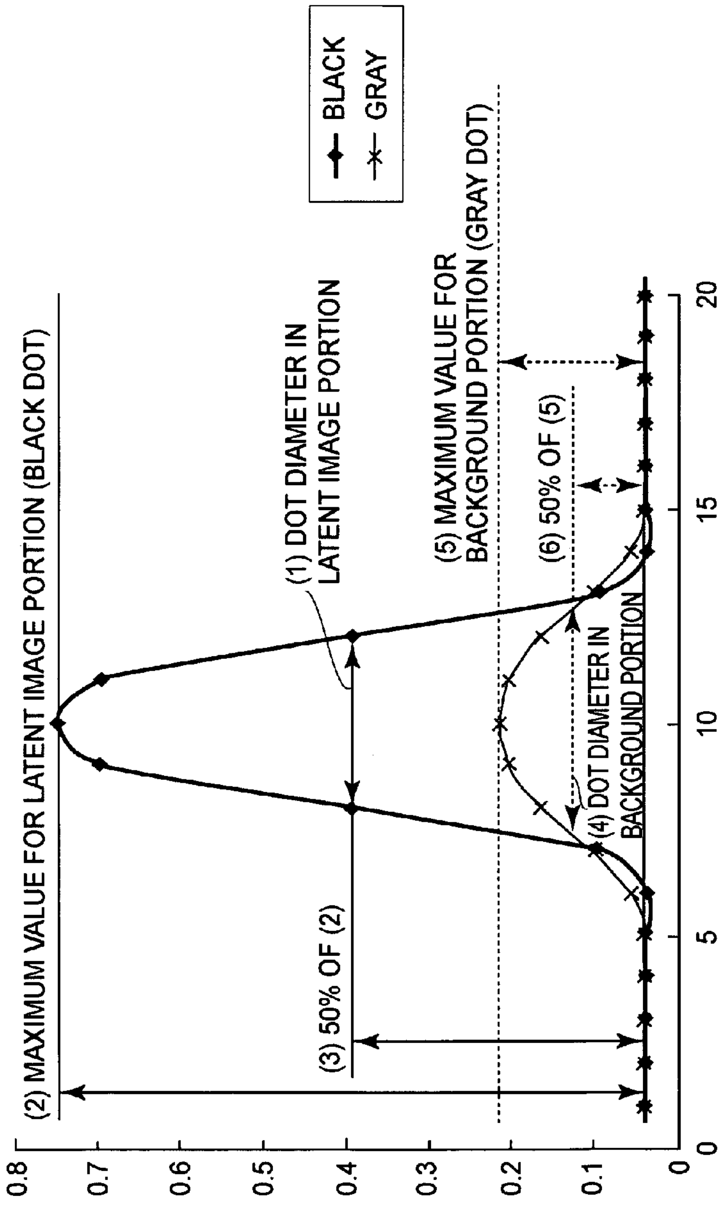
FIG. 8 illustrates a dot profile.

FIG. 8 is a chart of a density distribution at each pixel position when isolated dots at the latent image portion and the background portion are formed in the high-quality forgery-preventing pattern image forming mode under the output conditions in Table 1.

In FIG. 8, an abscissa represents a dot position (pixel position) and an ordinate represents a density which is obtained based on information indicated with a value obtained when the log conversion portion of the input image processing portion 301 has converted the input signal of an image read by the reader according to this embodiment. That is, the density taken on the ordinate is a value obtained by converting an image signal value from the reader portion 10 into a density value, which indicates a microscopic density. FIG. 8 illustrates a density distribution at each pixel position when isolated dots at the latent image portion and the background portion shown in FIG. 11 are read by the reader.

The density signal (FIG. 8) read by the reader includes a portion having a density level higher than a macroscopic density at the latent image portion and the background portion, from a microscopic point of view, under influence of the reader resolving power characteristics. Further, microscopically, each pixel has its own density distribution.

Hereinafter, a term "microscopic density" will be used to refer to a density per each reading resolution based on a signal value from the reader.

In FIG. 8, a reference numeral (1) denotes a dot diameter in a latent image portion (equivalent to an area in which the toner is deposit during copying), which is calculated by reducing to the half a difference between a maximum microscopic density value of dots in the read latent image portion (reference numeral (2)) and a microscopic density on a background of a paper (the microscopic density of 0.04). A reference numeral (4) denotes a diameter of dots at the background portion. The background portion dot diameter can be calculated in the same manner as in the case of the latent image portion dot diameter represented by the reference numeral (1). The dot diameter at the background portion where the gray toner is used is larger than that at the latent image portion.

As shown in FIG. 8, the slope of the curve for background portion gray dots is moderate, whereas that for black dots is abrupt. The slope of the curve for background portion gray dots is moderate because the difference between the density of gray dots and the density on the background of paper is small and thus a blur occurs in a large area (an area decreased in density) due to a partial permeation of light (emitted from a light source of the reader) reached across the paper.

FIG. 7 illustrates an input/output characteristic (hereinafter referred to as a "background color removal LUT") of the reader in this embodiment. The conversion of inputs and outputs for the reader is performed by the input image processing portion 301. As shown in FIG. 7, a value around an input signal level of 32 is converted into a density level of 0 (the input signal level of 32 corresponds to the density level of 0.25).

With the above setting, all the gray dots in FIG. 8 are erased by the background color removal LUT. On the other hand, the black dots in FIG. 8 can hardly be removed even by the background color removal LUT. Technically, when the background color removal area is extended to a high density area, it is also possible to remove a portion, of the background portion, having a density of more than 0.25. However, when such a background color removal LUT is used, the image quality of a copied product other than the forgery-preventing pattern image portion cannot be retained. That is, highlight portions are excessively removed. Accordingly, the density at the background portion is set at 0.25 or less.

An output signal modulated by the background color removal LUT is transmitted to the output image processing portion 502 (the original image in FIG. 4), and the output image processing portion 502 converts the received output signal into a binary signal (a signal indicating as to whether a toner image is formed or not) with the processing by the tone gradation correction portion for K and the dithering portion for K. In this embodiment, the copied output is formed with only the black toner. Accordingly, the separation output portion operates only at the time of printing out an original (including ordinary printing).

[Macroscopic Density of Forgery-Preventing Pattern]

With respect to the dot characteristics, the dot diameter is small enough to be removed by the background color removal LUT. When the dot diameter is larger, the density at the center of a dot comes closer to 0.6 (in the case of the gray toner), so that the dots cannot be removed. The increase in dot diameter means an increase in a halftone dot area ratio, which necessarily increases the macroscopic density. In this embodiment, the macroscopic density of forgery-preventing pattern image is set at 0.15 but is not limited to this value. It is preferable that the macroscopic density of forgery-preventing pattern image ranges from 0.12 to 0.25.

The relationship shown in FIG. 10 is satisfied even when the forgery-preventing pattern image density is in the range from 0.12 to 0.25. When the density is 0.10, which is out of the above density range, the density at the latent image portion is inconspicuous. At a density of 0.3, the density at the background portion is also reproduced, thus resulting in a low contrast image.

[Line Number of Background Portion and Latent Image Portion]

In an experiment, an image having different copy densities between the latent image portion and the background portion was generated and a research was carried out for a subjective evaluation among persons other than those skilled in the art. As a result, it was found that the density difference between the latent image portion and the background portion can be clear (i.e., the latent image portion can be visualized) enough to obtain a sufficient forgery-preventing pattern effect (i.e., a forgery-preventing effect) when it was 0.08 or more.

In consideration of this result, the line numbers at the latent image portion and the background portion are set so that the density difference between the latent image portion and the background portion on the copied product is 0.08 or more. More specifically, in this embodiment, the gray toner is used at the background portion (of a line number of 190 lpi) and the black toner is used at the latent image portion (of a line number of 166 lpi). For that reason, the density difference between the background portion and the latent image portion on the copied product is 0.08.

Here, the above-described line numbers at the latent image portion and the background portion are not limited thereto. For example, the line numbers can be appropriately selected so that the density difference of 0.08 or more on the copied image is obtained in the density range of about 0.12 to 0.25 used for the forgery-preventing pattern.

In this embodiment, the line number difference between the latent image portion and the background portion in the case of the high-quality forgery-preventing pattern image forming mode is set to be smaller than the line number difference between the latent image portion and the background portion in the case of the simple forgery-preventing pattern image forming mode, which uses the black toner only. Thus, the visualization of the latent image portion on the original is suppressed.

As described above, in this embodiment having the above configuration, the MTF characteristics in the case of using the gray toner (light color toner) are lower than the MTF characteristics in the case of using the black toner (dark color toner). Accordingly, even when the line number difference between the latent image portion and the background portion is set small, it is possible to sufficiently ensure the density (contrast) difference between the latent image portion and the background portion on the copied product.

As a comparative example, the case where an image is formed with a gray toner only or a black toner only will be considered.

In the case where an image is formed with only the gray toner (light toner) at both the latent image portion and the background portion, the density difference (contrast) between the latent image portion and the background portion on the copied product is about 0.02. On the other hand, in the case where an image is formed using only the black toner (dark toner) at both the latent image portion and the background portion, the density difference (contrast) between the latent image portion and the background portion on the copied product is about 0.03.

As described above, the contrast between the latent image portion and the background portion on the copied product can be increased by forming an image with the light toner at the background portion and with the dark toner at the latent image portion. In other words, the contrast between the latent image portion and the background portion during copying can be increased even when the line number difference between the latent image portion and the background portion is decreased compared with that in the case of forming the forgery-preventing pattern image with only the dark color toner or the light color toner.

[Maximum Density Condition]

In this embodiment, description is made with the maximum density of 0.6 for the light color toner and the maximum density of 1.5 for the dark color. However, the maximum density values are not limited to these values.

A copying MTF was measured in a state in which the content of the pigment (carbon black) as a colorant for each color has been adjusted to change a solid density. As a result, the above-described effect was achieved under maximum density conditions in Table 2.

TABLE 2

| High-quality FPP*1 feature | Condition |
|---|---|
| Macroscopic density | 0.12-0.25 |
| Colorant and max. density at background portion | gray: max. density of 0.8 or less |
| Colorant and max. density at latent image portion | black: max. density of 1.2 or more |

*1FPP means a forgery-preventing pattern.

[Forgery-Preventing Pattern]

Figure 5:
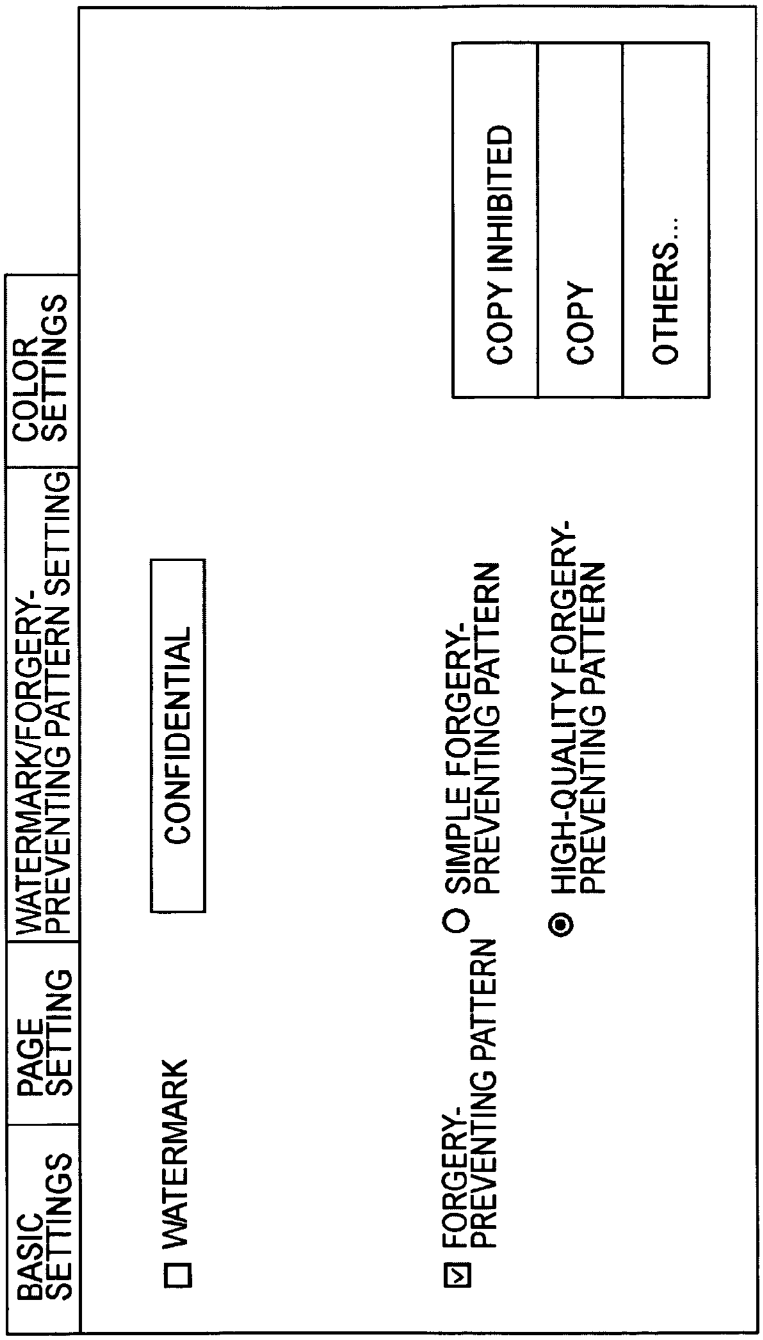
FIG. 5 is a schematic view illustrating a forgery-preventing pattern setting portion of a printer driver in Embodiment 1.

FIG. 5 illustrates a configuration of a property screen of the printer driver in this embodiment. A user (operator) of the image forming apparatus operates a "watermark/forgery-preventing pattern settings" button displayed on the property screen to provide an instruction for setting the conditions for forming forgery-preventing pattern image at the output image processing portion 502. In the case of performing print processing, a "forgery-preventing pattern" check box is not marked. When the user marks the forgery-preventing pattern check box, the user can select either the "simple forgery-preventing pattern image forming mode" or the "high-quality forgery-preventing pattern image forming mode".

Then, the user selects a character to be visualized after copying. When the user selects "Others . . . " button, then a text box (not shown) is displayed. The user can enter a character string in the text box. The character string entered in the text box is reproduced in the latent image portion of the forgery-preventing pattern image on a copied product.

The output conditions for the "high-quality forgery-preventing pattern image forming mode" and the "simple forgery-preventing pattern image forming mode", which are settable at the forgery-preventing pattern setting screen, are shown in Table 1 above.

This embodiment is characterized in that the gray toner is used at the background portion and the black toner is used at the latent image portion when the "high-quality forgery-preventing pattern image forming mode" is selected. When the forgery-preventing pattern check box is marked, the "high-quality forgery-preventing pattern image forming mode" and a "COPY" mode are automatically selected. In the case where the user desires to output under other conditions, the user may select the "Others . . . " button in performing print processing.

[Flow]

Figure 12:
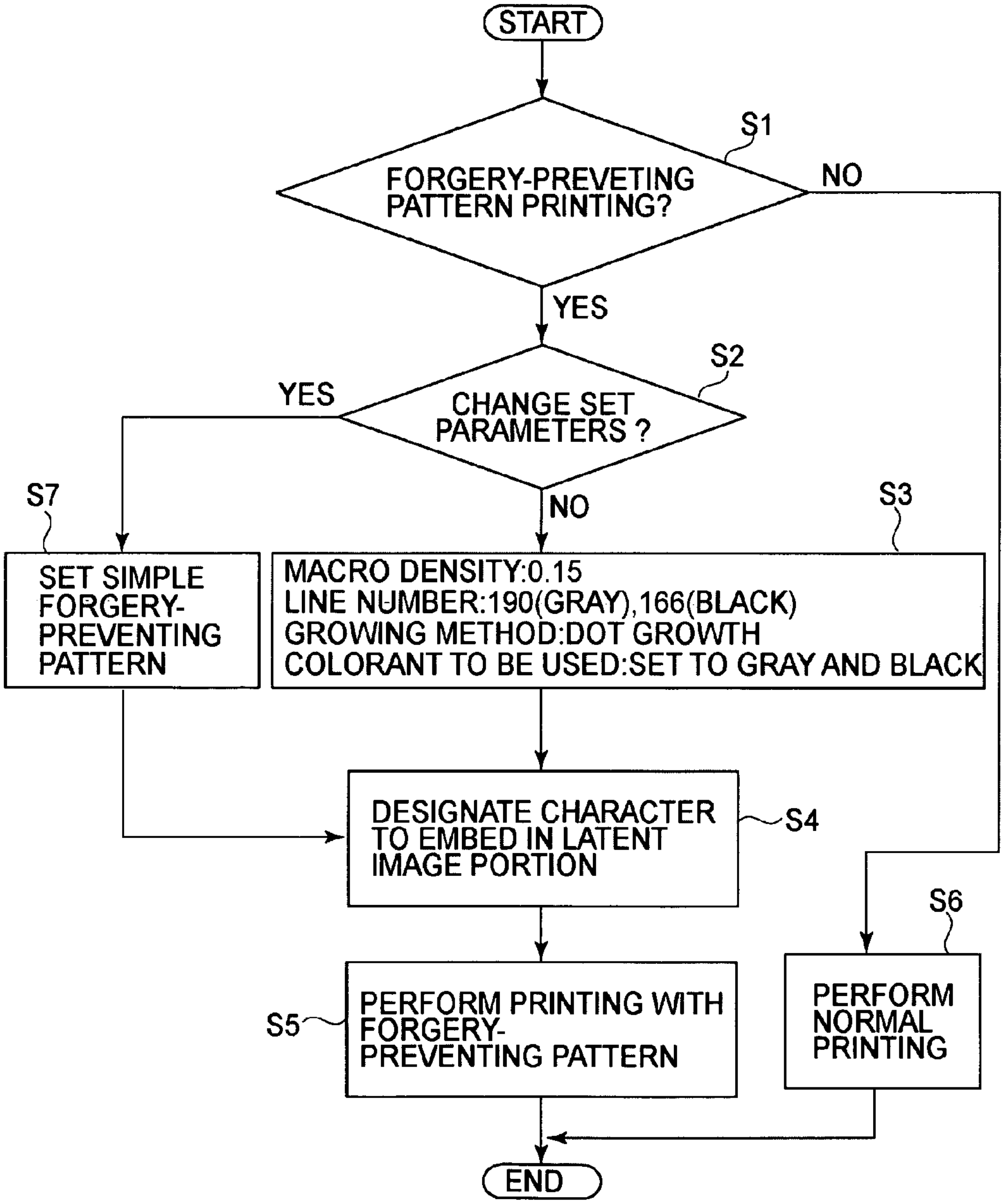
FIG. 12 is a flow chart for illustrating Embodiment 1.

A flow of output processing in this embodiment will be described with reference to FIG. 12.

After the user has inputted into the image forming apparatus a print job for which forgery-preventing pattern printing has been instructed via the printer driver property screen (FIG. 5), the image forming apparatus determines whether to perform forgery-preventing pattern printing or an ordinary (normal) printing (step S1).

In the case where the forgery-preventing pattern printing is selected (YES in step S1), the image forming apparatus checks whether the setting parameters have been changed or not (step S2).

In the case where an instruction that the setting parameters have not been changed is provided (YES in step S2), the image forming apparatus calls up a list of the settings in Table 1 (step S3) and the image forming apparatus provides an instruction to the output image processing portion so as to designate a character string or an image to be embedded (step S4).

In step S1, in the case where the forgery-preventing pattern printing is not selected (NO in step S1), a print (output) job goes to the ordinary printing operation (step S6).

In the case where, in step S2, the setting parameters are changed to those for the simple forgery-preventing pattern (Yes in step S2), the image forming apparatus sets the setting parameters for forming the forgery-preventing pattern (step S7). After the setting in step S7, the image forming apparatus provides an instruction for the character string to be embedded at the latent image portion (step S4).

After receiving the instruction from the image forming apparatus, the output image processing portion advances to the forgery-preventing pattern printing operation (step S5).

In steps S5 and S6, the respective printing operations are performed and then ended.

As described above, according to this embodiment, the forgery-preventing pattern image is formed with the gray toner at the background portion and with the black toner at the latent image portion. By doing so, it is possible to decrease the line number difference between the background portion and the latent image portion as small as possible, so that it is possible to reduce the degree of visualization of the forgery-preventing pattern on the original to a minimum.

Embodiment 2

Embodiment 2 in which a usability is improved will be described.

As described Embodiment 1, so long as the values described in Table 2 are used, the image forming apparatus has a sufficient characteristic as a forgery-preventing pattern system. However, even when the values in Table 2 can be arbitrarily changed, the user cannot easily know what should occur with a setting change (i.e., the purpose of changing the setting). In this embodiment, the image forming apparatus changes detailed conditions for the forming forgery-preventing pattern after the user has performed intuitive setting.

Figure 13:
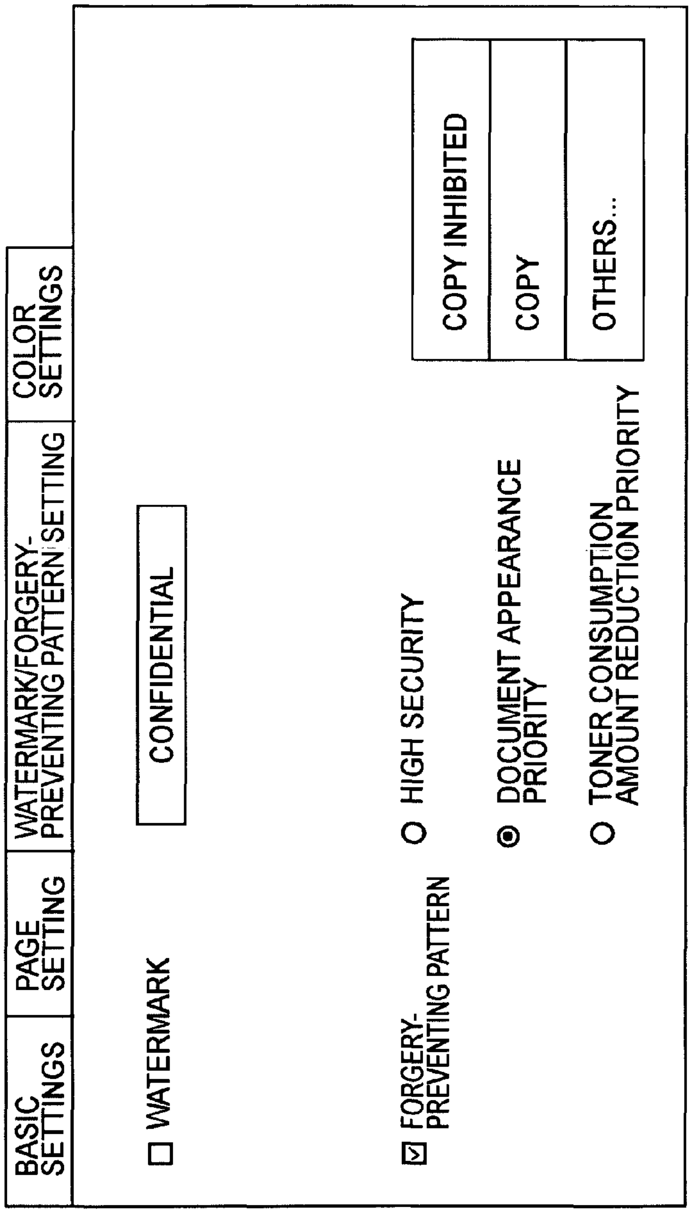
FIG. 13 is a schematic view illustrating a forgery-preventing pattern setting portion of a printer driver in Embodiment 2.
Figure 14:
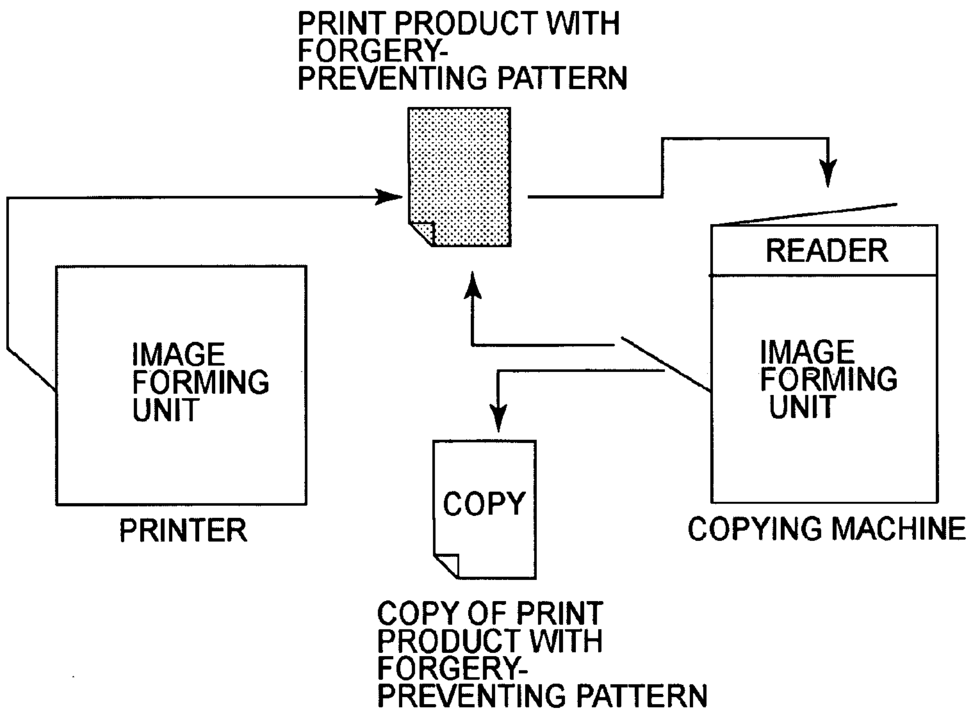
FIG. 14 is a schematic view for illustrating a relationship among a printer, a copying machine, and forgery-preventing patterns in a conventional method.
Figure 15:
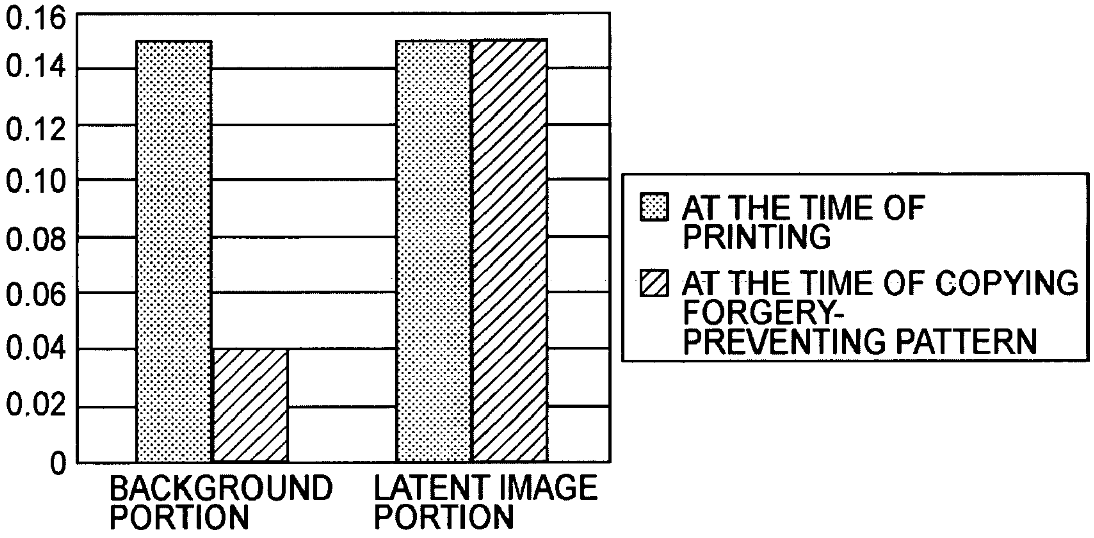
FIG. 15 illustrates a relationship between density levels of a print product having forgery-preventing pattern and a copied product thereof according to a conventional method.

In this embodiment, as shown in FIG. 13, a setting for the forgery-preventing pattern performed by the user are only the following three settings.

High-Security

Document Appearance (high-quality forgery-preventing pattern in Embodiment 1)

Toner Consumption Reduction

TABLE 3

| | High-Security | Document Appearance | Toner Consumption Reduction |
|---|---|---|---|
| Macroscopic density | 0.20 | 0.15 | 0.12 |
| Colorant for background portion | gray | gray | black |
| Colorant for latent image portion | black | black | black |
| line number at background portion | 200 lpi | 190 lpi | 268 lpi |
| line number at latent image portion | 106 lpi | 166 lpi | 166 lpi |

In this embodiment, the macroscopic density in the case where the "High-Security" has been selected is set at 0.2, which is higher than that in the case of the high-quality forgery-preventing pattern image forming mode in Embodiment 1. Further, the line number at the latent image portion is changed to 106 lpi. In the case where a macroscopic density is increased, the density at the latent image portion on a copied product is increased to about 0.2. At the background portion, the gray colorant is used and the line number is increased to 200 lpi. Under these conditions, the dots at the background portion are removed, so that the image obtained by copying has a density difference of about 0.16 (i.e., in this case, the background portion has the density of 0.04 and the latent image portion has the density of 0.2). For that reason, the density contrast between the latent image portion and the background portion is increased, so that it is possible to enhance the forgery-preventing effect.

The same settings as those in the case of the high-quality forgery-preventing pattern image forming mode in Embodiment 1 are used in the case where the "Document Appearance" is selected. The density is lower than that in the case of the "High-Security". This is because in the case where the density of forgery-preventing pattern is high, an ordinary (normal) image other than the forgery-preventing pattern image is adversely affected by the high density, thus being less visible.

In the case where the "Toner Consumption Reduction" is selected, the density is set to be lower than that in the case of the simple forgery-preventing pattern image forming mode in Embodiment 1, so that the toner consumption (amount) can be reduced. In this case, the gray toner is not used because the dot diameter can be decreased when the black toner is used, so that it is possible to reduce the toner consumption (amount).

As described above, the user can select among the above-described three modes depending on the purpose of use of the user or the significance degree of the job selected.

The forgery-preventing pattern information analysis portion of the output image processing portion 502 changes the forgery-preventing pattern image forming conditions depending on the mode selected by the user. The change in density is performed by the image generation portion. The change in line number is performed by the latent image portion dither processing portion and the background portion dither processing portion. In the case where the degree of dither is changed, the gradation reproducibility of the printer is also changed, so that it is necessary to correspondingly change the tables stored in the latent image portion tone gradation correction portion and the background portion tone gradation correction portion. In the case where the line number is not changed but only the density is to be changed, it is not necessary to change the tables stored in the respective tone gradation correction portions.

As described hereinabove, according to the present invention, by forming the background portion image of the forgery-preventing pattern with the light colorant and the latent image portion with the dark colorant, the forgery-preventing pattern reproducibility at the time of copying is improved. thus, the resultant image can achieve the effect as the forgery-preventing pattern, so that it is possible to provide a very high-quality forgery-preventing pattern image.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 111074/2007 filed Apr. 19, 2007, which is hereby incorporated by reference.

What is claimed is:

1. An image forming apparatus comprising:

a first image forming station for forming an image with a first toner;

a second image forming station for forming an image with a second toner having the same hue as and a higher lightness than the first toner; and a control portion for effecting control so that an image to be emphasized, including a first image portion and a second image portion, is formable, wherein the image to be emphasized disappears or has a lower density upon being copied, wherein the first image portion has a relatively low line number of an image to be formed and is formable substantially only with the first toner, and the second image portion has a relatively high line number of an image to be formed and is formable substantially only with the second toner.

2. An apparatus according to claim 1, wherein said control portion is capable of selectively executing a first mode for forming an image substantially only with the first toner for both the first image portion and the second image portion, and a second mode for forming an image substantially only with the second toner for the first image portion and substantially only with the first toner for the second image portion.

3. An apparatus according to claim 2, wherein a difference between a minimum distance between the centers of gravity between isolated dots formed at the first image portion and a minimum distance between the centers of gravity between isolated dots formed at the second image portion is smaller in the second mode than in the first mode.

4. An apparatus according to claim 1, wherein the first toner has an optical density of 1.2 or more after fixing when an amount of toner on the recording material is 0.5 mg/cm2, and the second toner has an optical density of 0.8 or less after fixing when an amount of toner on the recording material is 0.5 mg/cm2.

5. An image forming apparatus comprising:

a first image forming station for forming an image with a first toner;

a second image forming station for forming an image with a second toner having the same hue as and a higher lightness than the first toner; and a control portion for effecting control so that an image to be emphasized, including a first image portion and a second image portion, is formable, wherein the image to be emphasized disappears or has a lower density upon being copied, wherein the first image portion is formed by a first dither and is formable substantially only with the first toner and wherein the second image portion is formed by a second dither having a minimum distance, between isolated dots of an image to be formed, smaller than that of the first dither and is formable substantially only with the second toner.

6. An image processing apparatus for being used together with an image forming apparatus comprising a first image forming station for forming an image with a first toner and a second image forming station for forming an image with a second toner having the same hue as and a higher lightness than the first toner; said image processing apparatus comprising:

an input portion for inputting image data about a forgery-preventing pattern image to be emphasized, including a first image portion and a second image portion, wherein the forgery-preventing pattern image to be emphasized disappears or has a lower density upon being copied; and a control portion for effecting control so that the first image portion, which has a relatively low line number, is formable substantially only with the first toner and that the second image portion, which has a relatively high line number, is formable substantially only with the second toner.

7. An apparatus according to claim 6, wherein said control portion is capable of selectively executing a first mode for forming an image substantially only with the first toner for both the first image portion and the second image portion, and a second mode for forming an image substantially only with the first toner for the first image portion and substantially only with the second toner for the second image portion.

8. An apparatus according to claim 7, wherein a difference between a minimum distance between the centers of gravity between isolated dots formed at the first image portion and a minimum distance between the centers of gravity between isolated dots formed at the second image portion is smaller in the second mode than in the first mode.

9. An apparatus according to claim 6, wherein the first toner has an optical density of 1.2 or more after fixing when an amount of toner on the recording material is 0.5 mg/cm2, and the second toner has an optical density of 0.8 or less after fixing when an amount of toner on the recording material is 0.5 mg/cm2.

10. An image processing apparatus for being used together with an image forming apparatus comprising a first image forming station for forming an image with a first toner and a second image forming station for forming an image with a second toner having the same hue as and a higher lightness than the first toner, said image processing apparatus comprising:

an input portion for inputting image data about a forgery-preventing pattern image to be emphasized, including a first image portion and a second image portion, wherein the forgery-preventing pattern image to be emphasized disappears or has a lower density upon being copied; and a control portion for effecting control so that the first image portion is formed using a first dither and is formable substantially only with the first toner the second image portion is formed using a second dither with a minimum distance, between isolated dots of an image to be formed, smaller than that of the first dither and is formable substantially only with the second toner.

* * * * *